United States Patent Office 3,369,915
Patented Feb. 20, 1968

3,369,915
GYPSUM PRODUCT AND METHOD OF
MAKING SAME
John M. Lee, Lake Jackson, Tex., assignor to The Dow
Chemical Company, Midland, Mich., a corporation of
Delaware
No Drawing. Filed Oct. 1, 1964, Ser. No. 400,931
4 Claims. (Cl. 106—111)

ABSTRACT OF THE DISCLOSURE

Pulverulent gypsum, water, and an anionic surfactant are admixed to produce an improved wet, moldable gypsum paste having a lower water to gypsum ratio than has heretofore been useable and which sets to a high compressive strength mortar which is especially adaptable for use in the manufacture of sandwich-type plaster board or wall board.

The invention relates to useful products comprising gypsum and method of preparation thereof. Such products include construction boards and panels. They are commonly prepared by admixing gypsum in a pulverulent state with water, with or without certain additaments known to impart desired properties thereto, to make a slurry or paste, and positioning the paste or slurry so made between confining sheets of cellulosic or plastic materials and drying the resulting sandwich-type panel. Additaments include those which tend to lengthen or shorten the setting time, of the slurry or paste as desired, or to contribute to strength, flexibility, appearance, or the like of the final product. The term "gypsum" is used herein to mean the calcined product containing a predominant amount of $CaSO_4 \cdot \frac{1}{2} H_2O$ and also the dried product obtained after adding water to

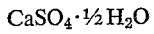

Although gypsum products possess a number of desirable properties, there is an existing need for a method of preparation thereof which would require a lower ratio of water to gypsum and would result in a product of increased structural and impact strength without detracting from other desirable properties of the slurry or dried final product.

Among additives used in attempts to improve properties of gypsum formulations and board are ligno-sulfonates. These known additives do little to reduce the viscosity of a given ratio of water/gypsum. Also gypsum boards containing ligno-sulfonates are subject to attack by certain insects (e.g., termites or ants which will feed on lignin) and also suffer from color bleed-through in plastering applications. Furthermore, the water-resistance of gypsum products containing ligno-sulfonates is not sufficient and moisture impermeable barrier coatings are required.

On object of the present invention is to provide thinners for a gypsum/water slurry, which are effective in small concentrations.

Another object is to provide gypsum products which have increased compression strength values.

A further object is to provide gypsum products which are not attacked by insects and do not suffer from color bleed-through. A still further object is to obtain gypsum products which are less water-sensitive than those now generally available. These and other objects are obtained by the following described invention.

The invention is a method of making an improved gypsum product and the improved product so made. The method of the invention comprises admixing pulverulent gypsum and water in an amount sufficient to provide adequate flow properties and an effective amount of a selected anionic surface active agent, positioning the resulting mixture in a suitable form or other confined space to provide desired shapes or configurations and drying the so positioned mixture to provide a suitable durable gypsum product of increased strength.

The weight ratio of water to gypsum employed in the invention may be such that there results a flowable or pumpable mixture. The weight ratio of water to gypsum employed is between about 0.4 and about 0.8. However, the preferred ratio is that which meets the requirements of fluidity for the specific purposes but is not substantially in excess of about 0.5. The higher the ratio of water to gypsum, the greater the costs and inconvenience that are entailed in material handling, the greater the length of the drying time required, and the lower the strength properties of the end product.

The amount of anionic surface active agent employed in the method of the invention should be at least about 0.08 percent by weight of the gypsum present in the mixture. An amount of surface active agent as high as, about 5.0 percent, may be employed, but amounts in excess of about 2 percent, and preferably not in excess of about 1.5 percent, are not recommended. Generally, less than about 0.1 percent by weight of the gypsum in the resulting mixture does not adequately lessen the water requirements and in amounts in excess of about 1.5 percent generally do not reflect noticeable improvement in the decrease in water required. The percent of surfactant usually employed is between about 0.5 and about 1.0 percent by weight of the gypsum present in the slurry. If desired, known retarders or accelerators to setting or hardening of the gypsum composition may also be admixed with the water-gypsum mixture.

Among the preferred anionic surface active agents to employ in the practice of the invention is the sodium salt of dodecylated sulfonated phenyl ether having the generic formula:

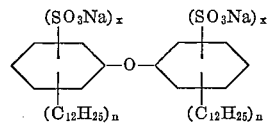

wherein each $x$ may be 1 or one $x$ may be zero and the other $x$ be two and wherein each $n$ may be 1 or one $n$ may be zero and the other either one or two. In other words, the arithmetical sum of the $x$ values of any molecule is 2 and the arithmetical sum of the $n$ values of any molecule is either 1 or 2. It is apparent that in a mixture thereof, $n$ may have an average value of from 1 to 2, inclusive.

Commonly available sodium salts of dodecylated sulfonated phenyl ether is a mixture of the above possible structures wherein a major proportion thereof consists of

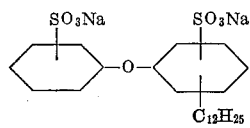

and a minor proportion of the mixtures of the other possibilities of the generic formula above. One such mixture of dodecylated sulfonated phenyl ether (referred to hereinafter sometimes as Additive Y) commercially available consists of about 80% by weight of the ether represented by the formula directly above and about 20% by weight of other possible compounds falling within the generic formula earlier given.

Other anionic surface active agents useful in the practice of the invention are the dioctyl esters of sodium sulfosuccinic acid, sodium polystyrene sulfonate, sulfonated alkyl esters and sodium salt of polyacrylic acid, and the sodium salt of sulfated nonyl phenol ethylene oxide adduct. The sodium salt of polyacrylic acid, as is subsequently shown herein, is highly effective at relatively low amounts.

The following tests were run to show the reduced water requirements in the preparation of the gypsum-water mixture and the improved strength properties of the final dried gypsum product.

SERIES 1

This series, consisting of tests 1, 2A and 2B, was run employing 200 grams of pulverulent gypsum and varying amounts of water. Some of the tests were in accordance with the invention wherein an anionic surfactant was incorporated with the water and gypsum whereas other tests were run which were not in accordance with the method of the invention and did not employ an anionic surfactant.

Test 1

This test was run for comparative purposes and is not illustrative of the invention. 200 grams of gypsum were admixed with 160 grams of water and mixing continued until a smooth substantially homogeneous paste resulted. 2-inch cubes thereof were cast and dried at room temperature at about 50% relative humidity and about 23° C. for about 16 hours and thereafter further dried at about 49° C. in a forced air oven for about 72 hours.

The cubes were tested for compressive strength employing the Tinius Olsen tester using a linear-loading rate of 0.107 inch/minute to the breaking point of the sample. The results obtained are shown in Table II, infra. The remaining paste so made was periodically tested for viscosity over a period of time, employing a Brookfield viscometer and the viscosity and the time which had elapsed from the time at which the water was added to the gypsum and the viscosity was measured and recorded. The results designated as Sample 1 are shown in Table I, infra.

Test 2

This test illustrates the practice of the invention. 200 grams of gypsum were placed in two separate containers, identified as A and B. In container A was added sufficient water to provide a water to gypsum ratio of 0.8. To container B was added sufficient water to give a water to gypsum ratio of 0.5. To each of the containers was admixed 0.75% by weight of the sodium salt of the dodecylated sulfonated phenyl ether (Additive Y) described above based on the dry weight of gypsum present. 2-inch cubes designated Samples 1, 2A and 2B were cast, dried, and tested for compressive strength as in Test 1. The results are set out in Table II, infra.

Viscosities were ascertained periodically on the remaining gypsum-water mixture containing the ratios of water to gypsum stated, at various time intervals up to the time that the mixtures began to take a permanent set. Viscosity values obained are shown in Table I as Samples 2A and 2B. The time which elapsed between the addition of the water to the gypsum and time at which the resulting gypsum-water composition began to assume a permanent set is referred to herein as time of beginning set. The time of beginning set for the composition prepared in Test 1, wherein the water to gypsum weight ratio was 0.8 and no additament was present, was 450 seconds. The time of beginning set for mixture A of Test 2, wherein the water to gypsum ratio was 0.8 and which contained 0.75% of the surface active agent, was 925 seconds. The time of beginning set for mixture B of Test 2, wherein the water to gypsum ratio was 0.5 and which contained 0.75% of the surface active agent, was 425 seconds.

TABLE I.—EFFECT OF PRESENCE OF ANIONIC ADDITIVE ON VISCOSITY OF GYPSUM-WATER SLURRY

| Sample No. 1 | | Sample No. 2A | | Sample No. 2B | |
|---|---|---|---|---|---|
| No Additive; Water/Gypsum Ratio of 0.8 | | 0.75% of Additive Y; Water-Gypsum Ratio of 0.8 | | 0.75% of Additive Y Water/Gypsum Ratio of 0.5 | |
| Time in Sec.[1] | Viscosity in Centipoises | Time in Sec. | Viscosity in Centipoises | Time in Sec. | Viscosity in Centipoises |
| 130 | 1,350 | 100 | 350 | 110 | 1,180 |
| 170 | 1,160 | 140 | 300 | 150 | 700 |
| 290 | 1,550 | 190 | 250 | 200 | 500 |
| 350 | 1,150 | 240 | 350 | 230 | 1,250 |
| 400 | 1,100 | 275 | 350 | 310 | 1,250 |
| [2] 450 | 1,350 | 450 | 500 | 375 | 1,050 |
| 500 | 3,650 | 600 | 800 | 400 | 1,300 |
| 540 | 10,000 | 730 | 650 | [4] 425 | 1,750 |
|  |  | [3] 925 | 1,050 | 450 | 2,250 |
|  |  | 950 | 4,000 | 495 | 10,000 |
|  |  | 1,000 | 4,900 |  |  |
|  |  | 1,025 | 6,400 |  |  |
|  |  | 1,050 | 9,600+ |  |  |

[1] Time which elapsed between addition of water and evidence of setting.
[2] Beginning set was indicated at 450 seconds.
[3] Beginning set was indicated at 925 seconds.
[4] Beginning set was indicated at 425 seconds.

Reference to Table I shows that where the water to gypsum ratio is 0.8, in the absence of an anionic surface active agent, the viscosity is undesirably high, in contrast to the lower viscosity after substantially the same lapse of time following admixture of the gypsum and water when 0.75 percent of an anionic surface active agent, in accordance with the invention. Further reference to the table shows that where the water to gypsum ratio is reduced to 0.5, in the presence of the anionic surface active agent, as required by the invention, the viscosity is not substantially higher than that wherein the water to gypsum ratio is 0.8, in the absence of the anionic surface active agent. The lower ratio of water to gypsum is highly desirable as aforestated.

Table II sets forth the compressive strength values obtained according to the prescribed procedure recommended for using the Tinius Olsen testing machine.

SERIES 2

Tests 3, 4, and 5 were prepared similarly to the examples of Series 1 with the following variations:

Test 3 consisted of a water to gypsum weight ratio of 0.8 and contained 0.5 percent of an anionic surfactant by dry weight of gypsum present in accordance with the invention.

Test 4 consisted of a water to gypsum weight ratio of 0.6 but no anionic surfactant, and therefore, is not illustrative of the practice of the invention.

Test 5 consisted of a water to gypsum weight ratio of 0.6 and contained 0.5 percent of an ionic surfactant, based on the weight of gypsum present in accordance with the invention.

2-inch cubes were cast of each composition prepared according to Tests 3 to 6 and dried according to the same procedure employed for the cubes cast in the tests of Series 1. The cubes, designated Samples 3 to 5, corresponding respectively to Tests 3 to 5, were tested for compressive strength, employing the Tinius Olsen tester. The values obtained are shown in Table II.

TABLE II.—COMPRESSIVE STRENGTH OF GYPSUM-WATER MIXTURES, WITH AND WITHOUT AN ANIONIC SURFACE ACTIVE AGENT

[All samples are two-inch dimentsional cubes]

| Sample No. | Water/Gypsum Ratio | Anionic Surfactant [1] Present | Sample Failure in p.s.i. |
|---|---|---|---|
| 1 | 0.8 | None | 987 |
| 2A | 0.8 | 0.75 | 797 |
| 2B | 0.5 | 0.75 | 2,122 |
| 3 | 0.8 | 0.5 | 1,000 |
| 4 [2] | 0.6 | None | 2,075 |
| 5 | 0.6 | 0.5 | 1,990 |

[1] Additive Y was employed.
[2] Was prepared with great difficulty and was too viscous for practical purposes.

Comparing the compressive strength values obtained for samples made according to the invention, e.g. 2A and 3, with that obtained for comparative Sample 1 shows that the presence of an anionic surface agent in a dried gypsum product, according to the practice of the invention, results in a compressive strength value which is not appreciably less than that obtained when prepared at the same water to gypsum ratio without the presence of the anionic surface active agent. Therefore, the presence of the surface active agent, which markedly lessens the viscosity of the wet mixture, in no way detracts from the compressive strength of the end product. What is more significant, the water to gypsum ratio, which in conventional practice, cannot be appreciably less in commercial operations than about 0.8 (because of the very high viscosity that results at lower proportions of water) can be lowered to 0.5 as shown in Sample 2B, resulting in a marked improvement also in the compressive strength value of the dried product.

The mixture employing a ratio of water to gypsum of 0.6, without the benefit of the anionic surface active agent, was not practical because of the great difficulty in mixing and handling. A mixture consisting of a water to gypsum ratio of 0.5, without the benefit of the anionic surface active agent, could not be easily prepared and was too viscous to be practical. On the other hand, the presence of 0.5% by weight of the anionic surfactant (based on the weight of the gypsum employed) allowed a mixture consisting of a water to gypsum ratio of 0.5 to be readily prepared, resulting in a high compressive strength value, approached only by Sample 3, which was too stiff and difficult to handle to be acceptable on a commercial scale.

SERIES 3

This series was run to show the use of surfactants other than the Additive Y shown in Series 1 and 2.

The surfactants employed were the sodium salt of a sulfate ester of nonylphenoxypoly(ethyleneoxy)ethanol available under the trademark Alipal CO-433; the dioctyl ester of sodium sulfosuccinic acid, available under the trademark Aerosol OT; a modified alkyl phosphate ester, available under the trademark Gafac GB-520; the sodium salt of polyacrylic acid, available under the trademark Tamol 731; sulfonated alkyl esters, available under the trademark Triton GR-5. Additional information may be found on each of the trademarked surfactants employed in the publication, Detergents & Emulsifiers, D&E 1963 Annual, by John W. McCutcheon, Inc., 236 Mount Kemble Avenue, Morristown, N.J. The results are shown in Table III.

TABLE III

| Sample Number | Additive | Percent Concentration of Additive | Ratio of Water to Gypsum | Time in Seconds | Viscosity in centipoises |
|---|---|---|---|---|---|
| 6A | Sodium salt of a sulfate ester of an alkylphenoxypoly(ethyleneoxy)ethanol. | 0.5 | 0.5 | 125 | 3500. |
| 6B | do | 0.5 | 0.5 | 180 | (Setting.) |
| 6C | do | 0.5 | 0.5 | 400 | (Setting.) |
| 7A | None | None | 0.5 | 0 | (Too high to measure.) |
| 7B | do | None | 0.5 | 170 | Set hard. |
| 8A | do | None | 0.8 | 130 | 1,350. |
| 8B | do | None | 0.8 | 500 | 3,650. |
| 8C | do | None | 0.8 | 540 | 10,000. |
| 9A | Dioctylester of sodium sulfosuccinic acid | 0.5 | 0.5 | 150 | 4,800. |
| 9B | do | 0.5 | 0.5 | 200 | (Setting.) |
| 9C | do | 0.5 | 0.5 | 600 | Set hard. |
| 10A | Modified alkyl phosphate ester | 0.5 | 0.5 | 130 | 3,900. |
| 10B | do | 0.5 | 0.5 | 1,300 | 1,950. |
| 10C | do | 0.5 | 0.5 | 4,500 | (Set hard.) |
| 11A | Sodium salt of polyacrylic acid | 0.1 | 0.45 | 170 | 3,950. |
| 11B | do | 0.1 | 0.45 | 325 | (Setting.) |
| 11C | do | 0.1 | 0.45 | 413 | (Set hard.) |
| 12A | do | 0.2 | 0.45 | 140 | 3,500. |
| 12B | do | 0.2 | 0.45 | 375 | 2,500. |
| 12C | do | 0.2 | 0.45 | 3,820 | (Set hard.) |
| 13A | do | 0.1 | 0.5 | 100 | 800. |
| 13B | do | 0.1 | 0.5 | 310 | 550. |
| 13C | do | 0.1 | .5 | 990 | (Setting.) |
| 13D | do | 0.1 | 0.5 | 1,100 | >10,000. |
| 14A | Sulfonated alkyl esters | 0.5 | 0.5 | 75 | 650. |
| 14B | do | 0.5 | 0.5 | 300 | 1,550. |
| 14C | do | 0.5 | 0.5 | 450 | (Setting.) |
| 14D | do | 0.5 | 0.5 | 800 | (Set hard.) |

In the table, the expressions in parentheses in the last vertical column mean that composition had either begun to set (setting) or had advanced to a hard solid (set hard) and the viscosity thereof could not be measured.

Reference to Table III shows that the absence of an anionic surfactant in a gypsum formulation comprising a 0.5 to 0.8 water to gypsum ratio results in a mixture that is too viscous to be worked. It also shows that the anionic surfactants employed decreased the viscosity and extended the setting time of water/gypsum mixtures with which they were admixed, thereby permitting a lesser proportion of water to gypsum to be employed.

Note in Tests 11A to 13D that the sodium salt of polyacrylic acid was particularly effective even at very low concentrations in a relatively low water to gypsum ratio of 0.45. In general, Table III shows that any surfactants employed resulted in higher compression strength values and allowed lower water to gypsum ratios to be prepared at easily workable viscosities.

Having described my invention, what I claim and desire to protect by Letters Patent is:

1. In a method of making solid gypsum products from a deformable paste comprising gypsum and water the improvement which comprises admixing water and pulverulent gypsum, in a weight ratio of water to gypsum of between about 0.4 and about 0.8, and between about 0.08 and about 5.0 percent, based on the dry weight of gypsum present, of the dodecylated sulfonated phenyl ether having the generic formula:

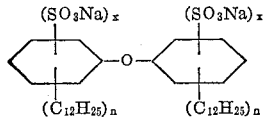

wherein the $x$ values have an arithmetical sum of 2 and wherein the $n$ values have an arithmetical sum selected from the class consisting of 1 and 2, forming the resulting paste into the desired shape, and drying the so formed paste to a hard solid of high compressive strength.

2. The method according to claim 1 wherein the dodecylated sulfonated phenyl ether is a mixture thereof comprising a major proportion of

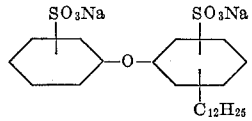

and a minor proportion of the other possible ethers falling within the generic formula of claim 1.

3. The method according to claim 1 wherein the water to gypsum ratio is between about 0.4 and about 0.6.

4. A dry gypsum composition of reduced water requirements capable of being mixed with water in a weight ratio of water to gypsum of between about 0.4 and about 0.8, comprising gypsum and between about 0.08 and about 5.0 percent, based on the weight of gypsum present, of the dodecylated sulfonated phenyl ether having the generic formula:

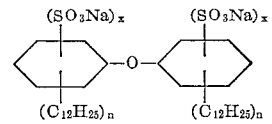

wherein the $x$ values have an arithmetical sum of 2 and wherein the $n$ values have an arithmetical sum selected from the class consisting of 1 and 2.

References Cited
UNITED STATES PATENTS

| | | | |
|---|---|---|---|
| 2,318,540 | 5/1943 | Talbert | 106—111 |
| 2,552,775 | 5/1951 | Fischer | 260—80 |
| 2,854,477 | 9/1958 | Steinhauer | 252—161 |
| 2,913,346 | 11/1959 | Hoffman | 106—111 |
| 2,921,862 | 1/1960 | Sucetti | 106—111 |
| 3,232,777 | 2/1966 | Bush | 106—90 |

TOBIAS E. LEVOW, *Primary Examiner.*

S. E. MOTT, *Assistant Examiner.*